US009438851B2

(12) United States Patent
Kang et al.

(10) Patent No.: US 9,438,851 B2
(45) Date of Patent: Sep. 6, 2016

(54) DISPLAY APPARATUS AND METHOD FOR PREVENTING DIVULGENCE OF IMAGE INFORMATION THEREOF

(71) Applicant: SAMSUNG ELECTRONICS CO., LTD., Suwon-si, Gyeonggi-do (KR)

(72) Inventors: Kun-sok Kang, Yongin (KR); Hak-sup Song, Suwon (KR); Sang-il Lee, Seongnam (KR); Joo-whan Lee, Seongnam (KR); Seong-seol Hong, Yongin (KR); Soo-yong Lee, Daejeon (KR); Mi-jin Choi, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/298,653

(22) Filed: Jun. 6, 2014

(65) Prior Publication Data
US 2015/0097918 A1    Apr. 9, 2015

(30) Foreign Application Priority Data
Oct. 4, 2013 (KR) .................... 10-2013-0118755

(51) Int. Cl.
*H04N 7/14* (2006.01)
*G06F 21/32* (2013.01)
(Continued)

(52) U.S. Cl.
CPC ............. *H04N 7/147* (2013.01); *G06F 21/32* (2013.01); *H04H 60/45* (2013.01); *H04L 65/1089* (2013.01); *H04N 7/155* (2013.01); *H04N 21/4223* (2013.01); *H04N 21/44218* (2013.01);

(Continued)

(58) Field of Classification Search
CPC ........ H04N 7/15; H04N 7/147; H04N 7/152; H04N 7/141; H04N 7/142
USPC ..................... 348/14.01, 14.07, 14.08, 14.12
See application file for complete search history.

(56) References Cited

U.S. PATENT DOCUMENTS

2005/0111388 A1    5/2005 Kim
2005/0177726 A1*   8/2005 Alasia et al. ................. 713/176
(Continued)

FOREIGN PATENT DOCUMENTS

EP    1534010 A2    5/2005
EP    2472452 A1    7/2012
(Continued)

OTHER PUBLICATIONS

Extended European Search Report dated Feb. 24, 2015 in corresponding European Patent Application No. 14170659.8.

*Primary Examiner* — Quoc D Tran
(74) *Attorney, Agent, or Firm* — Staas & Halsey LLP

(57) ABSTRACT

Disclosed are a display apparatus and a method for preventing divulgence of image data thereof which may prevent image information including image data photographed by a camera of the display apparatus from being divulged by hacking, etc. The display apparatus includes a camera which captures an image; a display which displays the image thereon based on image data captured by the camera; a communicator which communicates with an outside of the apparatus through an Internet; and a controller which transmits image information including the image data captured by the camera, in the form of a transmission packet including the image data and a detection mark or indicator capable of detecting or indicating that the image data is to be transmitted to the outside, when the image information is to be transmitted to the outside through the communicator.

23 Claims, 6 Drawing Sheets

(51) Int. Cl.
| | |
|---|---|
| *H04H 60/45* | (2008.01) |
| *H04N 21/4223* | (2011.01) |
| *H04N 21/442* | (2011.01) |
| *H04N 21/454* | (2011.01) |
| *H04N 21/475* | (2011.01) |
| *H04N 21/4788* | (2011.01) |
| *H04L 29/06* | (2006.01) |
| *H04N 7/15* | (2006.01) |
| *G06K 9/00* | (2006.01) |

(52) U.S. Cl.
CPC ...... *H04N 21/4542* (2013.01); *H04N 21/4753* (2013.01); *H04N 21/4788* (2013.01); *G06K 9/00288* (2013.01); *H04N 2007/145* (2013.01)

(56) References Cited

U.S. PATENT DOCUMENTS

2007/0002144 A1* 1/2007 Tsuchida ............... H04N 5/232
348/207.1
2008/0068447 A1 3/2008 Mattila et al.
2009/0010485 A1 1/2009 Lamb et al.
2009/0178085 A1* 7/2009 Narahara et al. ............... 725/62
2010/0085171 A1* 4/2010 Do ........................ G08B 21/06
340/426.1
2012/0026274 A1* 2/2012 Baker et al. ............... 348/14.01
2012/0166970 A1 6/2012 Gastaldi et al.
2012/0327176 A1* 12/2012 Kee ........................ H04N 7/15
348/14.08
2014/0006794 A1* 1/2014 Odessky ................ G06F 21/36
713/182
2015/0020210 A1* 1/2015 Brown ........................... 726/27

FOREIGN PATENT DOCUMENTS

| KR | 10-2007-0116715 | 12/2007 |
|---|---|---|
| KR | 10-2012-0094231 | 8/2012 |
| KR | 10-2013-0050374 | 5/2013 |
| WO | 2008/031216 A1 | 3/2008 |

* cited by examiner

DISPLAY APPARATUS AND METHOD FOR PREVENTING DIVULGENCE OF IMAGE INFORMATION THEREOF

CROSS-REFERENCE TO RELATED APPLICATIONS

This application claims priority from Korean Patent Application No. 10-2013-0118755, filed on Oct. 4, 2013 in the Korean Intellectual Property Office, the disclosure of which is incorporated herein by reference.

BACKGROUND

1. Field

Apparatuses and methods consistent with the exemplary embodiments discussed herein relate to a display apparatus and a method for preventing divulgence of image information thereof, and more particularly, to a display apparatus and a method for preventing divulgence of image information thereof which prevents image information including image data captured by a camera of the display apparatus from being divulged from the display apparatus to the outside of the apparatus by hacking, etc.

2. Description of the Related Art

With the development of the electronic communication industry, electronic devices including a portable terminal such as a smart phone and a display apparatus such a digital television (TV) have been developed into intelligent devices which perform multi-functions such as Internet communication and information search as well as their original functions.

In addition, widespread display apparatuses, such as a smart TV, which may access electronic communication networks, such as the Internet network, a local area network, etc., and receive multimedia contents including video/audio data and packet data therethrough have facilitated the study of display apparatuses which may customize and manage its functions such as with Internet communication and information search for each user.

The customized display apparatus provides respective users using the display apparatus with user accounts designated for each user for customization, and allows the users to use the functions of the display apparatus therethrough. Accordingly, any user who intends to log into his/her user account should perform user authentication.

The user authentication includes facial recognition through a camera, voiceprint recognition through a microphone, fingerprint recognition through a fingerprint recognition device and input of a user authentication code, such as ID and password.

Among the foregoing user authentication methods, facial recognition through the camera has emerged as an important authentication method of the customized display apparatus, with the display apparatuses being additionally equipped with the camera to perform a videoconferencing function in recent years.

However, image data of a scene including a user's face and surroundings that are photographed by the camera in the course of user authentication or stored in advance in a storage is exposed to a great risk of being divulged to the outside by hacking, etc. the communication due to the nature of the customized display apparatus that is used while being always connected to the Internet network.

To date, no customized display apparatus which may prevent the image data captured (or photographed) by the camera from being divulged by hacking has been developed.

SUMMARY

Additional aspects and/or advantages will be set forth in part in the description which follows and, in part, will be apparent from the description, or may be learned by practice of the invention.

Accordingly, one or more exemplary embodiments provide a display apparatus and a method for preventing divulgence of image data thereof which may prevent image information including image data captured by a camera of the display apparatus from being divulged by hacking, etc.

The foregoing and/or other aspects may be achieved by providing a display apparatus including: a camera which photographs a scene producing or capturing an image; a display which displays the image thereon based on image data captured by the camera; a communicator which communicates with the outside through an Internet (an unsecured network); and a controller which transmits image information including the image data captured by the camera, in the form of a transmission packet including the image data and a detection mark or indicator capable of detecting or indicating that the image data is to be transmitted to the outside of the apparatus, when the image information is to be transmitted to the outside through the communicator.

The detection mark may include at least one of a tag showing that the image information includes image data captured by the camera, and user information concerning who has photographed a scene. Here, the user information may include one of a user name and a user ID.

The controller may determine whether the image data are transmitted to the outside, based on whether the image information includes the detection mark when the image information is transmitted to the outside through the communicator.

At this time, the controller may further determine whether a video conference or video phone mode is performed or active when it is determined that the image data are transmitted to the outside, and when it is determined that the video conference or video phone mode is not performed or not active, the controller may display on the display a window including a message informing or indicating that the image data are transmitted to the outside, and a 'continue tab' for allowing a continued transmission of the image information to the outside and a 'cancel tab' for stopping transmission of the image information to the outside, and when it is determined that the video conference or video phone mode is performed, display on the display a window including the message only.

Alternatively, the controller may display on the display a window including a message informing or indicating that the image data are transmitted to the outside when it is determined that the image data are transmitted to the outside. Here, the window may further include a 'continue tab' for allowing the continued transmitting of the image information to the outside, and a 'cancel tab' for stopping transmitting the image information to the outside.

The display apparatus may further include a microphone for inputting an audio, and the image information may further include audio data that are input through the microphone.

The display apparatus may provide a customization function, and further include a storage to store therein image data captured by the camera, for each user.

The foregoing and/or another aspects may be achieved by providing a method for preventing divulgence of image information of a display apparatus which includes a camera, the method including: receiving a command for transmitting image information including image data photographed by the camera, to the outside; and transmitting the image information to the outside in the form of a transmission packet comprising the image data and a detection mark capable of detecting or indicating that the image data is to be transmitted to the outside, according to the command.

The detection mark may include at least one of a tag notifying that the image information includes image data photographed by the camera, and user information concerning who has photographed a scene. Here, the user information may include one of a user name and a user ID.

The method for preventing divulgence of image information of the display apparatus may further include: determining that the image data are transmitted to the outside depending on whether image information to be transmitted to the outside includes the detection mark; and displaying a window including a message informing or indicating that the image data are to be transmitted to the outside when it is determined that the image data are to be transmitted to the outside of the apparatus.

At this time, the method for preventing divulgence of image information of the display apparatus may further include determining whether a video conference or video phone mode is performed after determining that the image information is transmitted to the outside, and the displaying the window may include: displaying a window comprising the message and a 'continue tab' for allowing a continued transmission of the image information to the outside and a 'cancel tab' for stopping transmitting the image information to the outside when it is determined that the video conference or video phone mode is not performed; and displaying a window including the message only when it is determined that the video conference or video phone mode is performed.

Alternatively, the displaying the window may include displaying a window including the message and a 'continue tab' for allowing a continued transmission of the image information to the outside and a 'cancel tab' for stopping transmitting the image information to the outside.

The display apparatus may perform a customization function, and the image data photographed by the camera may include image data captured in real-time by the camera or image data stored for each user in advance.

Alternatively, the image information may further include an audio input through a microphone.

The foregoing and/or another aspects may be achieved by providing a method that may include converting image data into a data packet, adding an indicator to the packet for indicating that the packet is to be transmitted outside the display apparatus when the packet is to be transmitted outside the display apparatus, and initiating transmitting the packet. The method may further include displaying, when the packet includes the indicator, the image data to a user with a message indicating the image data is to be transmitted outside the display apparatus and allowing the user to stop the transmitting.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
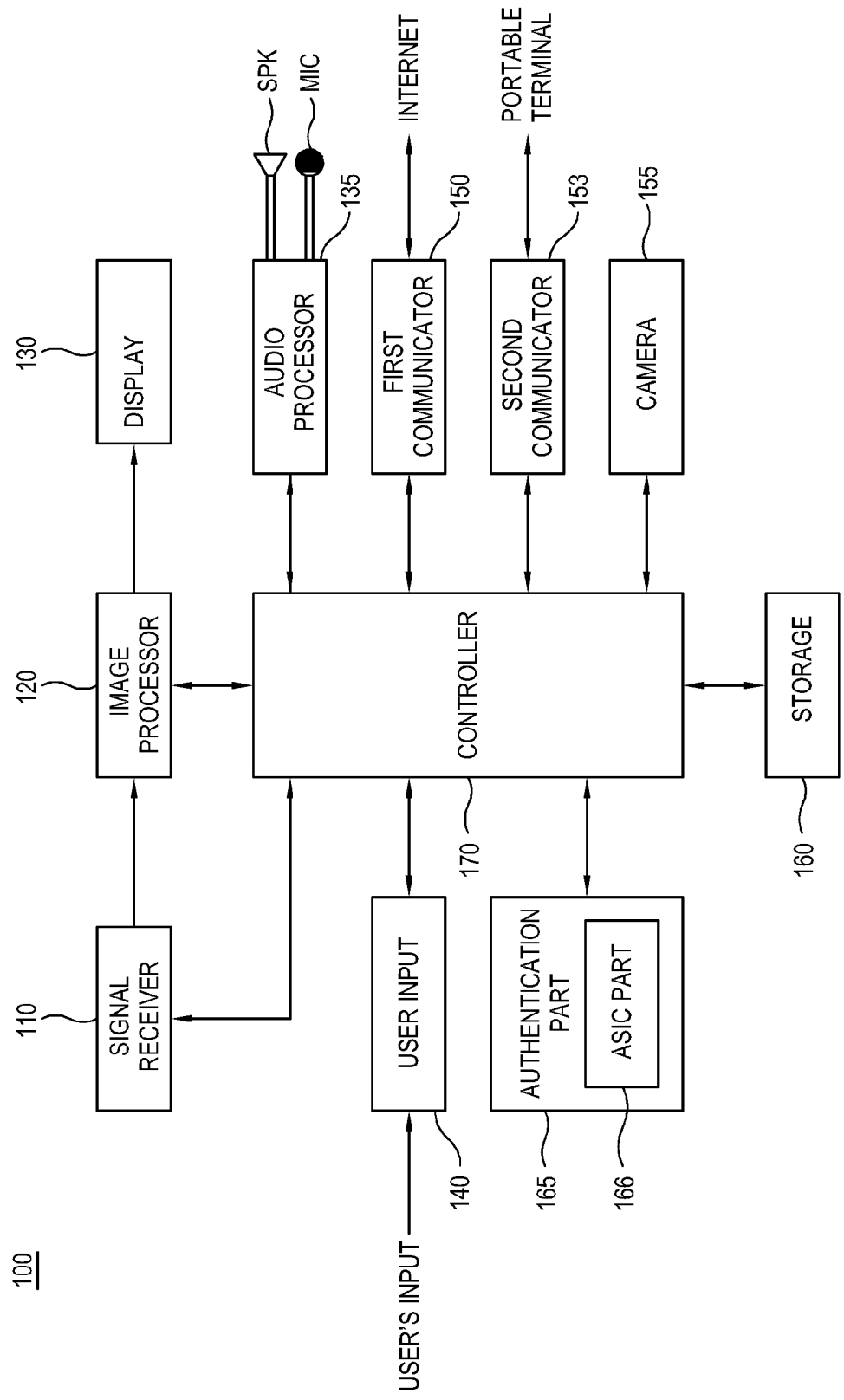
FIG. 1 is a block diagram of a display apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a display apparatus and a method for preventing divulgence of image information thereof according to embodiments will be described in detail with reference to accompanying drawings.

FIG. 1 is a block diagram of a display apparatus 100 according to an embodiment.

The display apparatus 100 according to the embodiment performs customized functions for customizing and managing functions of the display apparatus 100 for each user. For example, the display apparatus 100 may include a device for displaying an image such as a smart TV or an IP TV. Hereinafter, the display apparatus 100 which is implemented as a smart TV will be explained as an example.

Referring to FIG. 1, the display apparatus 100 includes a signal receiver 110, an image processor 120, a display 130, an audio processor 135, a user input 140, first and second communicators 150 and 153, a camera 155, a storage 160, an authentication part 165 and a controller 170.

The signal receiver 110 may receive image signals included in broadcasting signals that are transmitted by a broadcasting signal transmission device (not shown), receive image signals from imaging devices such as DVD players or BD players, receive image signals from a personal computer (PC), receive image signals through a network such as the Internet or receive image contents as image signals stored in a storage medium such as a universal serial bus (USB) stick. The signal receiver 110 may be configured to include a tuner or a connection interface.

The image processor 130 may process image signals that are received through the signal receiver 110 to allow the display 130 to display an image based on the processed image signals. The signal processor 120 may decode image signals, enhance images or scale image signals.

The display 130 displays an image thereon based on an image signal processed by the image processor 120. In displaying an image, the display 130 is not limited, and may be formed as a liquid crystal display (LCD), an organic light emitting diode (OLED), an active matrix organic light emitting diode (AMOLED) or other flat display panels.

The audio processor 135 processes an audio signal that has been separated from an external broadcasting signal by a demultiplexer (not shown), and outputs the processed audio signal to a speaker SPK according to a control of the controller 170.

If a microphone MIC is used as an element of the authentication part 165 for inputting authentication information of a user who is allowed to use a customization function of the display apparatus 100, the audio processor 160 modulates and converts the audio signal provided by the microphone MIC into audio data, under the control of the controller 170.

The controller 170 stores the converted audio data as authentication information in the storage 160, or compares the converted audio data with those stored as authentication information in the storage 160 and performs user authentication, according to a user's command that is input through the user input 140 in a customization authentication menu (not shown) of an ASIC (Application Specific Integrated Circuit) part 166 (to be described later) displayed on the display 130, or through an external portable terminal (not shown) that is permitted to be linked to the customization function of the display apparatus 100.

The user input 140 receives the user's command. The user input 140 may include, e.g., a remote controller (not shown) and a remote control signal receiver (not shown) that receives a remote control signal including key input information corresponding to the user's input from the remote controller.

The first communicator 150 communicates with an external service server and/or website through the Internet (an unsecured communication network). The first communicator 150 exchanges user's input and information of analysis results of the user's input with the service server, according to the control of the controller 170.

The second communicator 153 communicates with an external portable terminal in a wired or wireless manner (via a wireless communication network). The second communicator 153 may include at least one module for near field communication (NFC), i.e., Wi-Fi, Bluetooth, IrDA, Zigbee, wireless LAN and ultra wideband (UWB).

Figure 2:
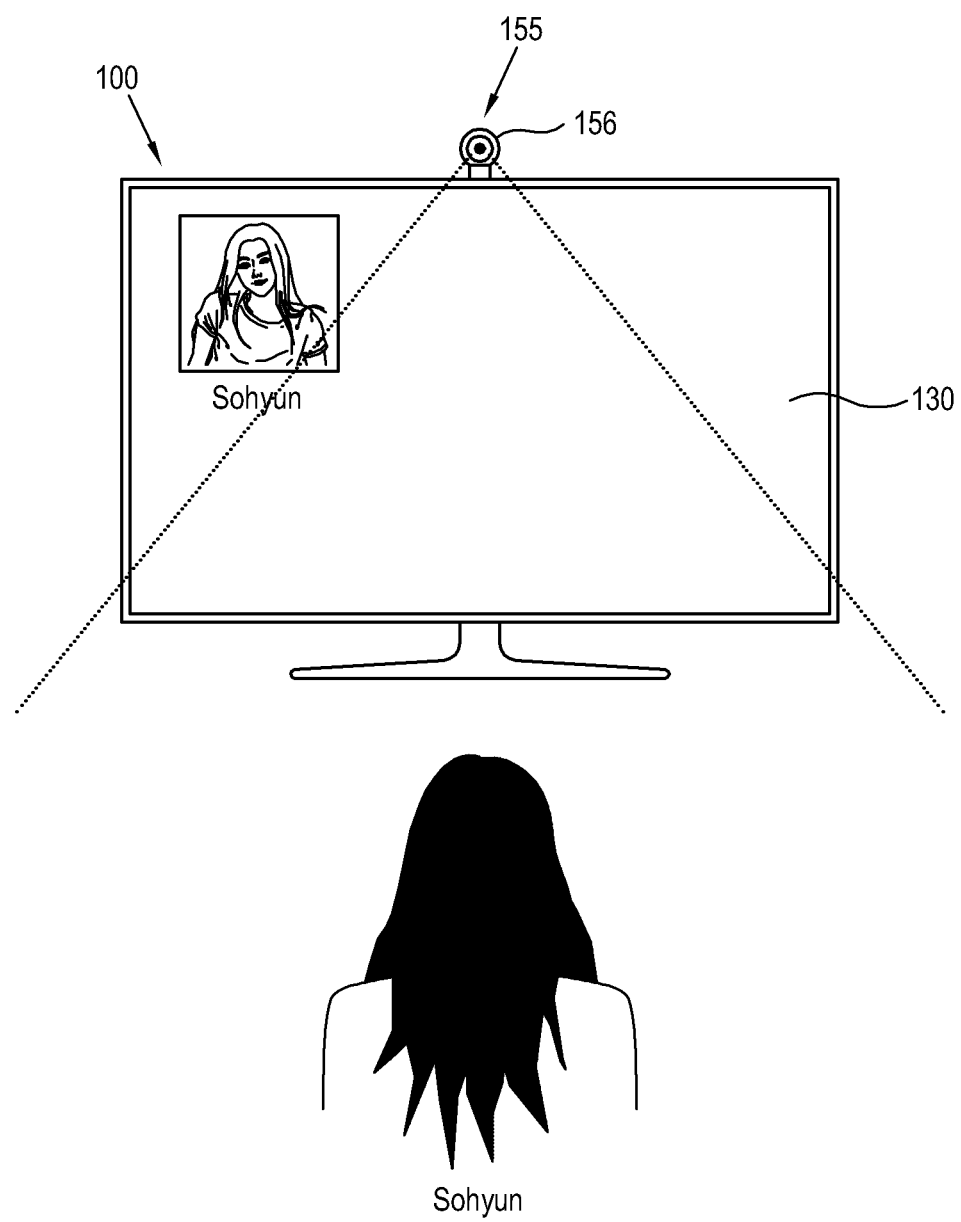
FIG. 2 illustrates an example of photographing a scene to produce an image by a camera of the display apparatus in FIG. 1.

The camera 155 converts an optical signal of a scene into an image signal, and may include a camera module 156. The camera module 156 processes and converts an image signal that is obtained by an image sensor in a video phone mode or photographing mode into image data including image frames, such as still images or videos. The converted image data may be displayed on the display 110 under the control of the controller 170 as shown in FIG. 2.

The camera module 156 captures a user's image such as a user's face under the control of the controller 170 when the camera module 156 is used as an element of the authentication part 165 for inputting the user's authentication information to allow the user to use the customization function of the display apparatus 100. The controller 170 stores the photographed or captured image frame of the user as authentication information in the storage 160, or compares the image frame of the user with an image frame stored as authentication information in the storage 160 and performs user authentication, according to the user's input that is given through the customization authentication menu of the ASIC part 166 of the authentication part 165.

The storage 160 stores therein contents (broadcasting channels, video on demand (VOD), etc.) that are played by the display apparatus 100, or programs for controlling the display apparatus 100.

The storage 160 stores therein a user's authentication information for authenticating usage of the customization function of the display apparatus 100. The user's authentication information may include personal information including user's authentication code and user name, user's images and user's voice. The user's authentication code includes an ID and a password set by the user.

The storage 160 stores therein image information according to each user. The image information includes image data, such as still images or videos captured by the camera 155 and/or audio data input through the microphone MIC, while the display apparatus 100 is used.

The storage 160 stores therein a list of a user's desired contents (e.g., VOD and broadcasting channels) that has been obtained by the controller 170 through the Internet based on customization data extracted from status information. The status information is related to usage history of application programs, search words during web-browsing, broadcasting viewing history, usage history of contents, etc., and is collected by an external portable terminal allowed to be linked to the customization function of the display apparatus 100 or collected by the controller 170. The status information is used to foresee the user's desired content. The customization data are used to search the contents through the Internet and form the list of the user's desired contents, and to display the list upon request from the user, by the control of the controller 170.

The storage 160 may be realized as at least one storage medium of a flash memory, a hard disc, a micro type multimedia card, a card type memory (e.g. SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The authentication part 165 authenticates user's authentication information for the user who has been allowed to use the customization function of the display apparatus 100 to use the customization function.

The authentication part 165 may be realized as the ASIC part 166 that is designed to have an authentication program for performing the authentication process by using the user's authentication information.

If there is a request for allowing the usage of the customization function of the display apparatus 100 through the user input 140 or the external portable terminal, e.g., if the user logs into a user account for user customization through the user input 140 or the external portable terminal, the ASIC part 166 includes a customization authentication menu (not shown) that is displayed on the display 130 under the control of the controller 170. As explained above, the user's authentication information may include personal information including user's authentication code including ID and password set by the user and user name, user's images and user's voice. The user's authentication information may be input or stored in the storage 160, by the user input 140, the external portable terminal, the camera module 156 of the camera 155 and the microphone MIC through the customization authentication menu of the ASIC part 166 that is displayed on the display 130 when the user authentication is performed or authentication information is set.

Hereinafter, it is assumed that the user's authentication information includes a user's image that is photographed or captured by the camera module 156 of the camera 155 and stored in the storage 160.

For example, in a case of setting authentication information, when the user input and selects "user name (or a user ID)" and "camera authentication" of "authentication information setting" item on the customization authentication menu displayed on the display 130, through the user input 140 or the external portable terminal, the controller 170 drives the camera module 156 of the camera 155 and captures a user's image and stores the photographed image frame, together with the user name (or user ID), as authentication information in the storage 160.

In a case that the user logs into the user account for customization, when the user inputs and selects "user name (or user ID)" and "camera authentication" of "authentication information inputting" item on the customization authentication menu displayed on the display 130 through the user input 140 or the external portable terminal, the controller 170 drives the camera module 156 of the camera 155 and captures a user's image, and compares the image frame with the image frame of the user name (or user ID) stored as authentication information in the storage 160, and if the two frames are identical, allows the user log into the customization function of the display apparatus 100.

The controller 170 controls overall functions of the display apparatus 100, and in particular, controls functions of the display apparatus 100 according to an input signal that is input by the user input 140 and received from the external portable terminal through the second communicator 153.

As explained above, when the user sets authentication information, the controller 170 drives the camera module 156 of the camera 155, captures the user's image and stores the photographed image frame, together with the user name, as authentication information in the storage 160 and when the user logs into the user account for customization, drives the camera module 156 of the camera 155, photographs or captures the user's image, compares the photographed image frame with the image frame of the user name stored as authentication information in the storage 160, and if two frames are equal or match, allows the user log into the customization function of the display apparatus 100.

The controller 170 searches a user's desired content (e.g., VOD and broadcasting channels) on a regular basis through the Internet, based on customization data transmitted by the external portable terminal or collected by the controller 170. The controller 170 stores in the storage 160 the list of the desired content that has been obtained by the search, and upon request from the user, displays the list stored in the storage 160.

The controller 170 transmits image information including image data captured by the camera 155 and/or audio data input through the microphone MIC according to a user's command input through the user input 140 and the external portable terminal, to an external service server or website through the first communicator 150, and monitors divulgence of the image information through the first communicator 150 to the outside of the display apparatus 100 without a user's command, such as over an insecure network.

Figure 3A:
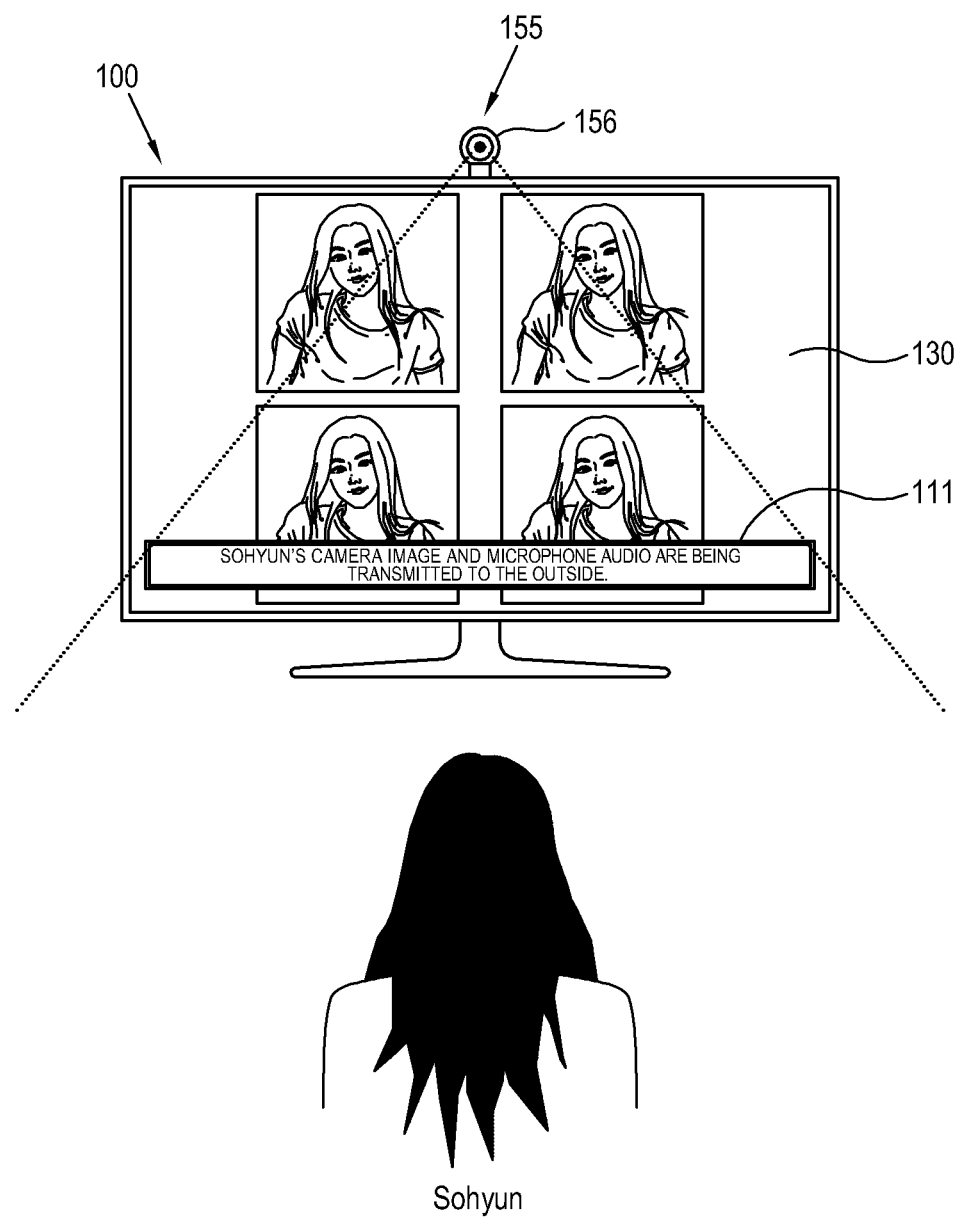
FIGS. 3A and 3B illustrate a window displayed by a display when image information including image data and audio data are transmitted to the outside by the display apparatus in FIG. 2.

More specifically, as shown in FIG. 3A, the controller 170 outputs image information, including image data and/or audio data, in an image and audio through the display 110 and the speaker SPK when a video conference or video phone mode is performed or activated according to a user's command input through the user input 140 and the outer portable terminal, and at same time, encodes the image information through an encoder (not shown) and transmits the encoded image information to the service providing server or website, such as Skype, through the first communicator 150.

If any image information includes image data captured by the camera 155 and/or audio data input through the microphone, the controller 170 controls the first communicator 150 to transmit the image data and/or audio data in the form of a transmission packet including a detection mark or indicator for detecting or indicating the transmission of the image data and/or audio data, as in Table 1 below, to the service providing server or website. The detection mark may include a tag such as 'camera' and/or user information which shows that image information includes the image data photographed by the camera 155. The user information may include a user name such as 'Sohyun' or user ID.

TABLE 1

| | Example of transmission packet of image information | | | | |
|---|---|---|---|---|---|
| | | Detection Mark | | | |
| Header | Tag | User Information | Image/Audio Data | . . . | Tail |
| | Camera | Sohyun | . . . | . . . | |

Accordingly, the controller 170 may detect that the image data captured by the camera 155 and/or the audio data input through the microphone MIC are transmitted to the service providing server or website through the Internet by determining whether the image information includes the detection mark.

The controller 170 may display on the display 130 a window 111 including a message ("Sohyun's camera image and microphone audio are being transmitted to the outside.") informing or indicating that image information including image data and/or audio data is transmitted to the outside. Accordingly, the user may recognize through the message that the camera image and/or microphone audio is transmitted to the outside of the display apparatus 100 and is susceptible to unauthorized viewing.

If the service providing server or website transmits corresponding image information through the first communicator 150, the controller 170 decodes the received image information through a decoder (not shown) and divides the received image information into image data and audio data through a demultiplexer (not shown), and then process the divided image data and audio data through the image processor 120 and the audio processor 135, respectively, and outputs an image and audio through the display 130 and the speaker SPK, respectively, based on the processed image data and audio data.

When image information stored in the storage 160 or image information including image data and/or audio data that are photographed/captured and/or input in real-time through the camera 155 and/or microphone MIC is transmitted to the outside of the apparatus 100 through the first communicator 150 by hacking or the like without a user's command, the controller 170 determines whether the image information includes the detection mark, i.e., the tag and/or the user information, and if the image information includes the detection mark, the controller 170 detects that the image information including the image data and/or audio data is transmitted to the outside.

Figure 3B:
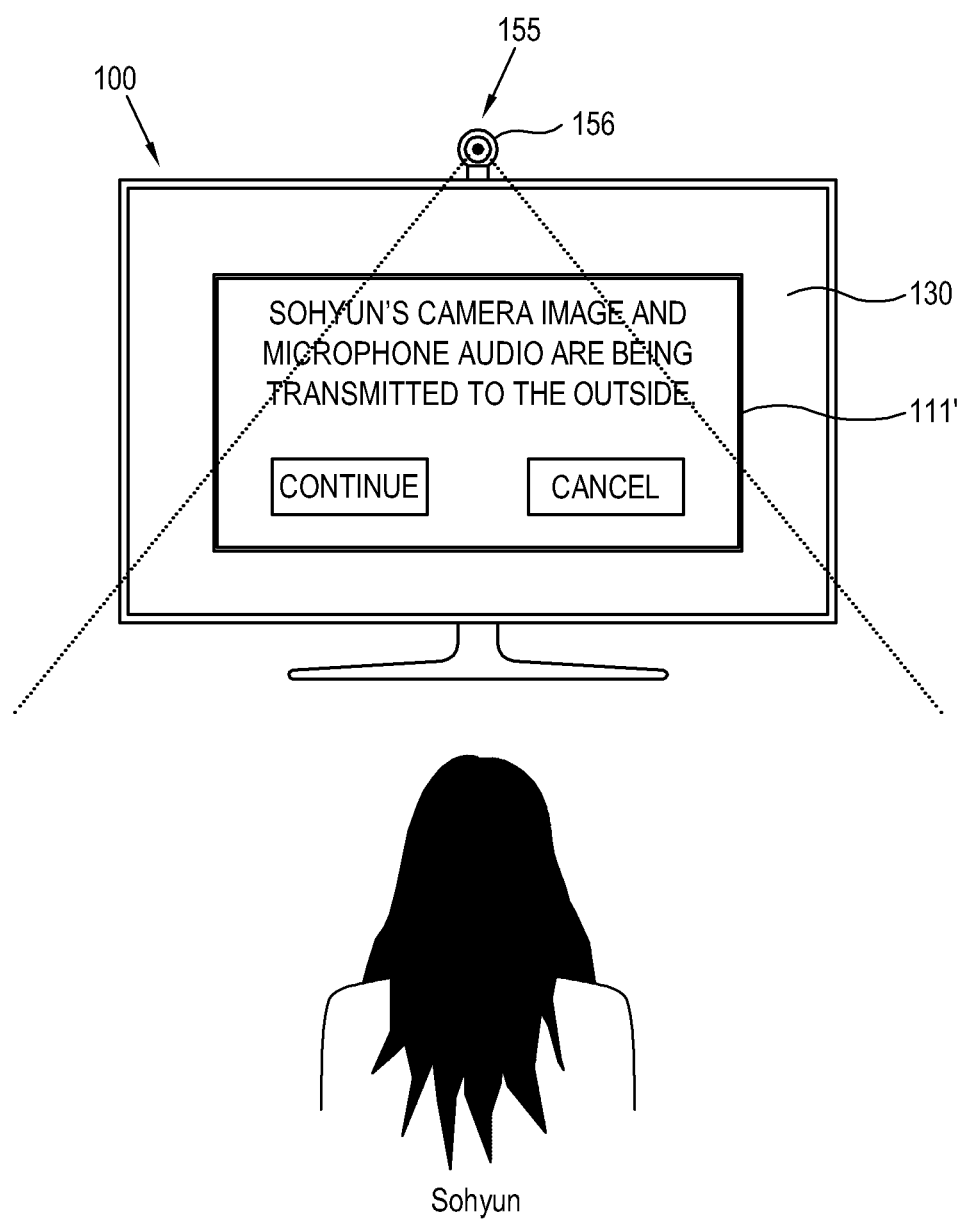

At this time, as shown in FIG. 3B, the controller 170 may display on the display 130 a window 111' including the message ("Sohyun's camera image and microphone audio are being transmitted to the outside.") informing that the image information including the image data and/or audio data is transmitted to the outside. The window 111' may include a 'continue tab' which allows a continued transmission of image information to the outside, and a 'cancel tab' which stops transmitting the image information to the outside.

Accordingly, if the foregoing message is displayed on the display 130 even though the user has not input a command to transmit the image information to the outside through the user input 140 and the portable terminal, the user may recognize that the image data photographed or captured by the camera 155 and/or the audio data input through the microphone MIC is transmitted to the outside possibly over an insecure network without his/her permission, and accordingly may select the 'cancel tab' to stop transmitting the image information to the outside of the apparatus 100.

The controller 170 may include a central processing unit (CPU), and execute a firmware or operating program (not shown) which is programmed to control operations of respective elements. The controller 170 may further include a non-volatile memory such as a flash memory to store operating programs therein, and a volatile memory such as a DDR to load at least a part of the stored operating program for prompt access by the CPU.

Figure 4:
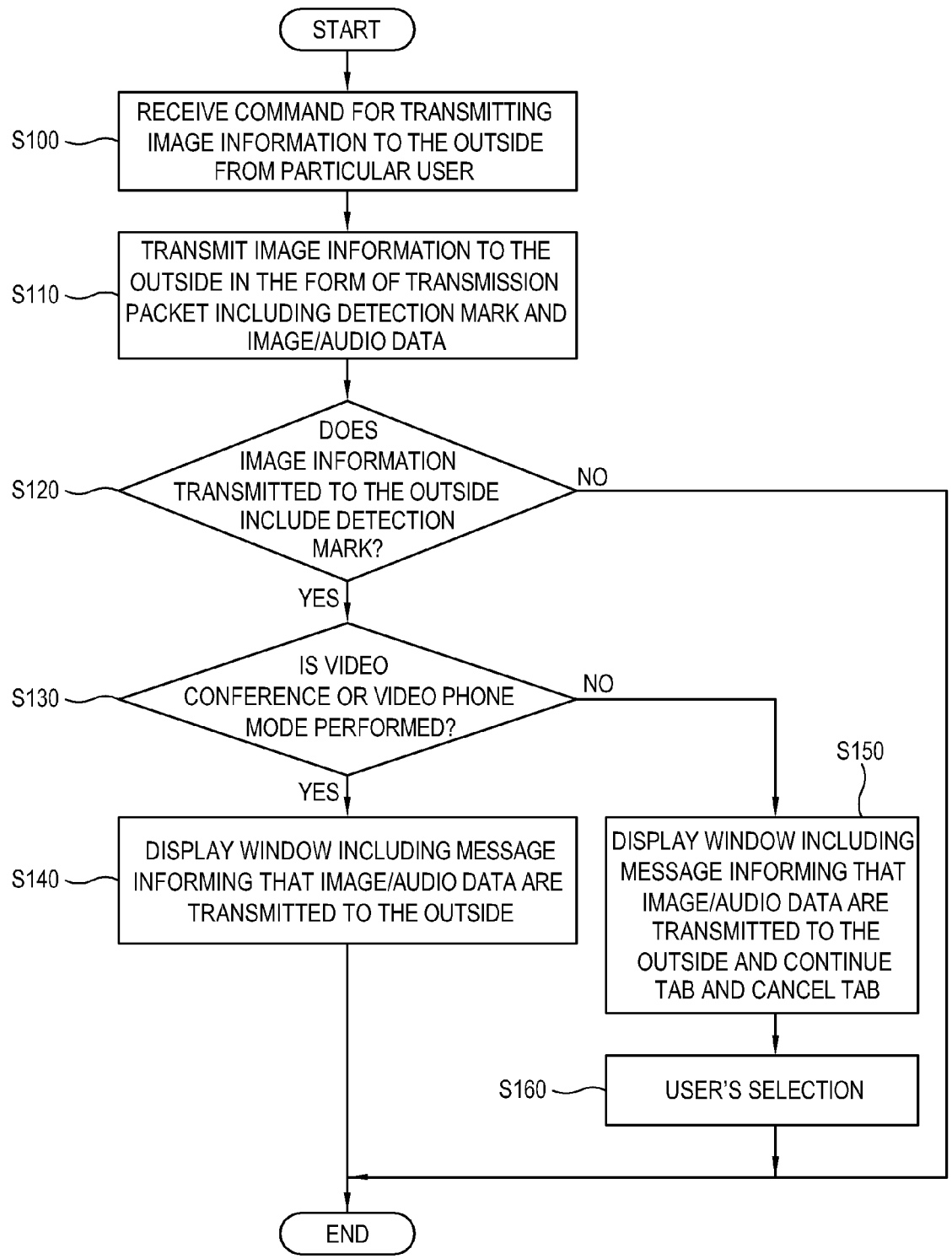
FIG. 4 is a flowchart showing an example of preventing divulgence of image information by the display apparatus according to the embodiment.

FIG. 4 is a flowchart showing a method for preventing divulgence of image information of the display apparatus 100 according to the embodiment.

The controller 170 receives from a particular user a command for transmitting image information stored in the storage 160 or image information including image data photographed by the camera 155 and/or audio data input through the microphone MIC in real-time to the outside (S100). The particular user includes a legal user who has duly accessed the display apparatus 100 through user authentication to use the customization function of the display apparatus 100 through the user input 140 or the external portable terminal allowed to be linked to the display apparatus 100, or an illegal user, i.e., a hacker who has illegally accesses the display apparatus 100 through the first communicator 150 by hacking authentication information from the Internet.

The controller 170 transmits the image information to the outside in the form of the transmission packet including the detection mark and image/audio data through the first communicator 150 according to the particular user's command (S110). The detection mark may include the tag which shows that the image information is the image data photographed and input by the camera 155 and the microphone MIC, and/or user information including the user name or user ID.

The controller 170 detects whether the image data captured by the camera 155 and/or the audio data input through the microphone MIC are transmitted to the outside by determining whether the image information which is to be transmitted to the outside includes the detection mark, i.e., the tag and/or the user information (S120).

If it is determined at operation S120 that the image data and/or audio data are to be transmitted to the outside, the controller 170 further determines whether the video conference or video phone mode is performed or active (S130).

If it is determined at operation S130 that the video conference or video phone mode is performed, the controller 170 displays on the display 130 the window 111 including the message informing that the image data and/or audio data are transmitted to the outside, as explained with reference to FIG. 3A (S140). A user watching the display apparatus 100 may recognize from the window 111 that the image data of the camera 155 or audio data input through the microphone MIC are to be transmitted to the outside.

By contrast, if it is determined at operation S130 that the video conference or video phone mode is not performed, the controller 170 may display on the display 130 the window 111' including (i) the message informing that the image data and/or audio data are to be transmitted to the outside, and (ii) the 'continue tab' and 'cancel tab', as explained with reference to FIG. 3B (S150).

Then, the user may select the 'continue tab' or 'cancel tab' to allow the continued transmission of the image information to the outside or stop the transmission of the image information, depending on whether he/she has requested the transmission of the image information to the outside (S160). As a result, the image information including the image data photographed by the camera 155 and/or audio data input through the microphone MIC is prevented from being divulged to the outside without the user's command.

Thereafter, the controller 170 may end the operation for preventing the divulgence of the image information according to a user's command for turning off the display apparatus 100 or repeat the operations for preventing the divulgence of the image information (S100 to S160).

It has been exemplified and explained that the operations (S100 to S160) for preventing the divulgence of the image information of the display apparatus 100 include determining whether the image data captured by the camera 155 and/or the audio data input through the microphone MIC are transmitted to the outside (S120) of the display apparatus 100 and then determining whether the video conference or video phone mode is performed (S130), but the embodiment is not limited thereto.

Figure 5:
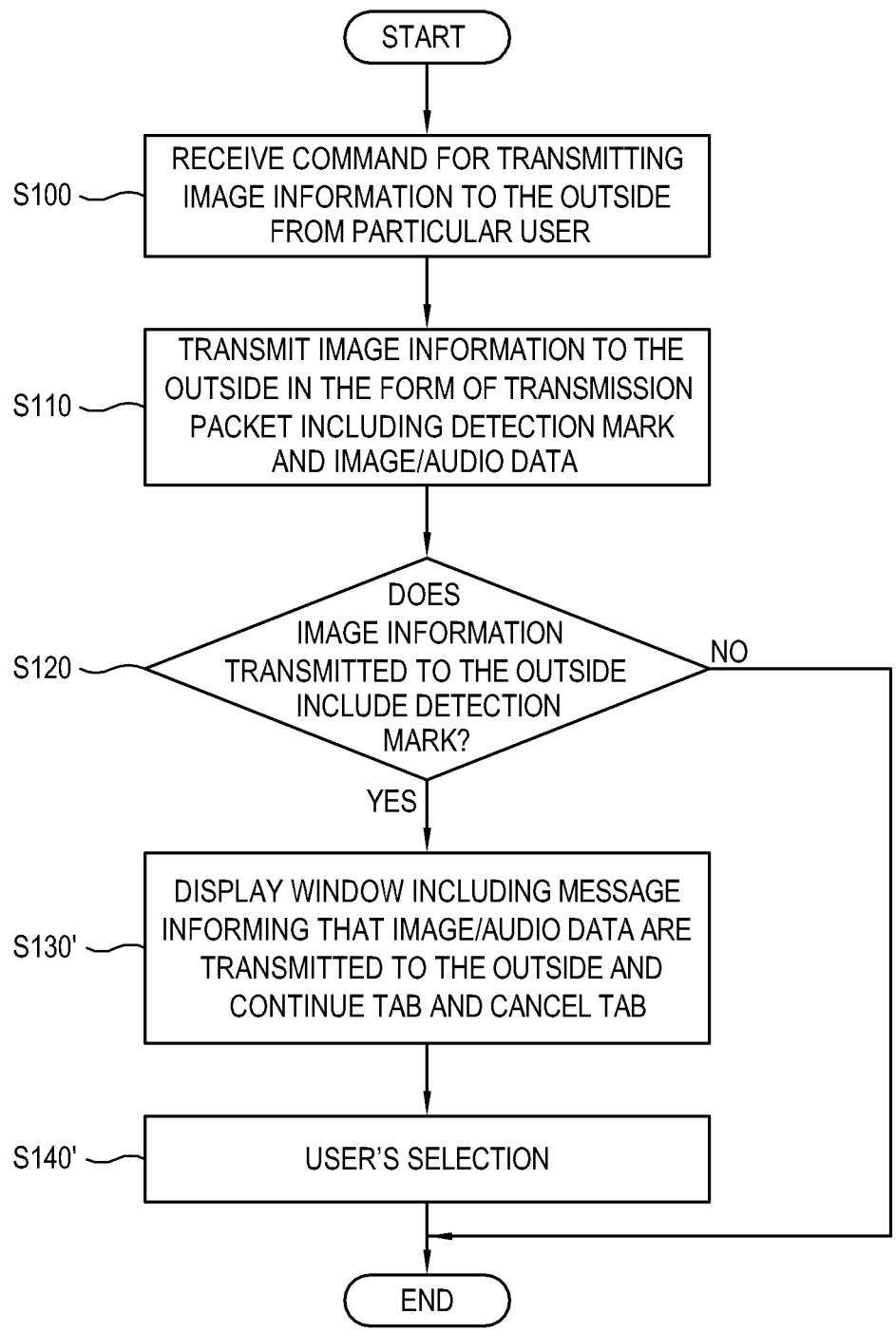
FIG. 5 is a flowchart showing another example of preventing divulgence of image information by the display apparatus according to the embodiment.

For example, referring to FIG. 5, after it is determined whether the image data and/or audio data are transmitted to the outside (S120), the controller 170 may immediately display on the display 130 the window 111' including the message informing or indicating that the image data and/or the audio data are to be transmitted to the outside, and the 'continue tab' and 'cancel tab' (S130').

At this time, a user may select the 'continue tab' or 'cancel tab' to allow the continued transmission of the image information to the outside of the apparatus 100 or stop the transmission of the image information, depending on whether he/she has requested the transmission of the image information (S140'). As a result, the image information including the image data obtained by the camera 155 and/or audio data input through the microphone MIC is prevented from being divulged without a user's command.

As explained above, in the display apparatus and the method for preventing divulgence of image information thereof according to the embodiments, the controller 170 transmits the image information to the outside in the form of the transmission packet including the detection mark and the image/audio data through the first communication unit 150 if the command for transmitting the image information including the image data photographed by the camera 155 and/or the audio data input through the microphone MIC to the outside is input by the particular user. As a result, the controller 170 may determine through the detection mark whether the image data and/or audio data are transmitted through the first communicator 150 to the outside, and display the windows 111 and 111' including the message informing or indicating that the image data and/or audio data are to be transmitted to the outside of the apparatus 100. Accordingly, the user may allow the continued transmission of the image information to the outside or stop transmitting the image information depending on whether he/she has requested for the transmission of the image information to the outside, and thus may prevent the image data and/or audio data from being divulged without his/her command.

Although a few exemplary embodiments have been shown and described, it will be appreciated by those skilled in the art that changes may be made in these exemplary embodiments without departing from the principles and spirit of the embodiments, the range of which is defined in the appended claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A display apparatus, comprising:
    a camera which photographs a scene to capture an image;
    a display which displays the image thereon based on image data captured by the camera;
    a communicator which communicates with an outside of the display apparatus through a communication network; and
    a controller which determines whether image information comprises, either first image information in which the image data captured by the camera is not included or second image information in which the image data captured by the camera is included, when the image information is transmitted via the communicator to the outside, and in response to the image information comprising the first image information, transmits the first image information to the outside, and in response to the image information comprising the second image information, performs a security operation with respect the second image information and transmits the second image information to the outside,
    wherein the security operation comprises forming a transmission packet of the transmitted second image information to comprise a detection mark showing that the image information includes the image data captured by the camera.

2. The display apparatus according to claim 1, wherein the detection mark comprises at least one of a tag showing that the image information comprises the image data captured by the camera, and user information concerning who has photographed the scene.

3. The display apparatus according to claim 2, wherein the user information comprises one of a user name and a user ID.

4. The display apparatus according to claim 1, wherein the controller determines whether the image data are to be transmitted to the outside, based on whether the image information comprises the detection mark when the image information is to be transmitted to the outside via the communicator.

5. The display apparatus according to claim 4, wherein the controller further determines whether a video conference or video phone mode is active when it is determined that the image data are to be transmitted to the outside, and when it is determined that the video conference or video phone mode is not active, displays on the display a window comprising a message indicating that the image data captured by the camera are to be transmitted to the outside, a 'continue tab' for allowing a continued transmission of the image information to the outside, and a 'cancel tab' for stopping transmission of the image information to the outside, and when it is determined that the video conference or video phone mode is active, displays on the display a window comprising the message only.

6. The display apparatus according to claim 4, wherein the controller displays on the display a window comprising a message indicating that the image data captured by the camera are to be transmitted to the outside when it is determined that the image data are to be transmitted to the outside.

7. The display apparatus according to claim 6, wherein the window further comprises a 'continue tab' for allowing the continued transmission of the image information to the outside, and a 'cancel tab' for stopping transmission of the image information to the outside.

8. The display apparatus according to claim 1, further comprising a microphone for inputting an audio, wherein the image information further comprises audio data that is input through the microphone.

9. The display apparatus according to claim 1, providing a customization function, and further comprising a storage to store therein the image data captured by the camera, for each user.

10. A method for preventing divulgence of image information of a display apparatus which comprises a camera, the method comprising:
    receiving a command for transmitting image information to an outside of the display apparatus;
    determining whether the image information comprises either first image information in which image data captured by the camera is not included or second image information in which the image data captured by the camera is included; and
    in response to the image information comprising the first image information, transmitting the first image information to the outside, and in response to the image information comprising the second image information, performing a security operation with respect the second image information and transmitting the second image information to the outside,
    wherein the security operation comprises forming a transmission packet of the transmitted second image information to comprise a detection mark showing that the image information includes the image data captured by the camera.

11. The method according to claim 10, wherein the detection mark comprises at least one of a tag notifying that the image information comprises the image data captured by the camera, and user information concerning who has photographed the scene.

12. The method according to claim 11, wherein the user information comprises one of a user name and a user ID.

13. The method according to claim 10, further comprising:
    determining that the image data are to be transmitted to the outside depending on whether image information to be transmitted to the outside comprises the detection mark; and
    displaying a window comprising a message indicating that the image data captured by the camera are to be transmitted to the outside when it is determined that the image data are to be transmitted to the outside.

14. The method according to claim 13, further comprising determining whether a video conference or video phone mode is active after determining that the image information is to be transmitted to the outside, wherein the displaying the window comprises:

displaying a window comprising the message, a 'continue tab' for allowing a continued transmission of the image information to the outside, and a 'cancel tab' for stopping transmission of the image information to the outside when it is determined that the video conference or video phone mode is not active; and displaying a window comprising the message only when it is determined that the video conference or video phone mode is active.

15. The method according to claim 13, wherein the displaying the window comprises displaying a window comprising the message, a 'continue tab' for allowing a continued transmission of the image information to the outside, and a 'cancel tab' for stopping transmission of the image information to the outside.

16. The method according to claim 10, wherein the display apparatus performs a customization function, and the image data captured by the camera comprise image data captured in real-time by the camera or image data stored for each user in advance.

17. The method according to claim 10, wherein the image information further comprises an audio that is input through a microphone.

18. A method, comprising:

converting image data in a display apparatus into a data packet;

determining whether the image data is captured by a camera;

in response to the image data not being captured by the camera, initiating transmitting the data packet and in response to the image data being captured by the camera, adding an indicator to the data packet for indicating that the packet is to be transmitted to an outside of the display apparatus; and initiating transmitting the data packet.

19. A method as recited in claim 18, further comprising displaying, when the packet includes the indicator, the image data to a user with a message indicating the image data captured by the camera is to be transmitted outside the display apparatus.

20. A method as recited in claim 19, further comprising allowing the user to stop the transmitting.

21. A method, comprising:

converting image data into a data packet;

determining whether the image data is captured by a camera; and in response to the image data not being captured by the camera, initiating transmitting the data packet, and in response to the image data being captured by the camera, adding an indicator to the data packet for indicating that the data packet has been transmitted over an insecure network; and initiating transmitting the data packet over the insecure network.

22. A method as recited in claim 21, further comprising displaying, when the data packet includes the indicator, the image data to a user with a message indicating the image data is to be transmitted over the insecure network.

23. A method as recited in claim 22, further comprising allowing the user to stop the transmitting.

* * * * *